US012723444B2

(12) United States Patent
Zejda

(10) Patent No.: US 12,723,444 B2
(45) Date of Patent: Sep. 1, 2026

(54) CLOSING DEVICE FOR A MOTOR VEHICLE LOCK

(71) Applicant: Kiekert AG, Heiligenhaus (DE)

(72) Inventor: Jan Zejda, Chrudim (CZ)

(73) Assignee: Kiekert AG, Heiligenhaus (DE)

( * ) Notice: Subject to any disclaimer, the term of this patent is extended or adjusted under 35 U.S.C. 154(b) by 112 days.

(21) Appl. No.: 18/253,959

(22) PCT Filed: Dec. 2, 2021

(86) PCT No.: PCT/DE2021/100958

§ 371 (c)(1),
(2) Date: Jun. 1, 2023

(87) PCT Pub. No.: WO2022/117152

PCT Pub. Date: Jun. 9, 2022

(65) Prior Publication Data

US 2024/0003169 A1 Jan. 4, 2024

(30) Foreign Application Priority Data

Dec. 3, 2020 (DE) ..................... 10 2020 132 139.2

(51) Int. Cl.
*E05B 81/20* (2014.01)
*E05B 81/06* (2014.01)
(Continued)

(52) U.S. Cl.
CPC .............. *E05B 81/21* (2013.01); *E05B 81/06* (2013.01); *E05B 81/34* (2013.01); *E05B 81/46* (2013.01)

(58) Field of Classification Search
CPC .......... E05B 81/21; E05B 81/06; E05B 81/34; E05B 81/46
(Continued)

(56) References Cited

U.S. PATENT DOCUMENTS 5,642,636 A * 7/1997 Mitsui ..................... E05B 77/40
292/201
6,565,131 B2 5/2003 Roos
(Continued)

FOREIGN PATENT DOCUMENTS

CN 107223174 A 9/2017
DE 19828040 B4 5/2005
(Continued)

OTHER PUBLICATIONS

International Search Report mailed Feb. 8, 2022, for priority International Application No. PCT/DE2021/100958.

*Primary Examiner* — Kristina R Fulton
*Assistant Examiner* — James Edward Ignaczewski
(74) *Attorney, Agent, or Firm* — Renner, Otto, Boisselle & Skylar, LLP; Lawrence S. Drasner

(57) ABSTRACT

A closing device for a motor vehicle lock, in particular to a closing aid for a motor vehicle door lock. According to its basic design, said closing aid has a locking mechanism substantially consisting of a rotary latch and a pawl. Furthermore, an electric motor and a transmission following the electric motor are realized. The transmission operates on the rotary latch at least during a closing operation. According to the invention, for the mechanical interruption of the closing operation, the transmission has a force flux element which can be selectively engaged and disengaged.

12 Claims, 4 Drawing Sheets

(51) Int. Cl.
*E05B 81/34* (2014.01)
*E05B 81/46* (2014.01)

(58) Field of Classification Search
USPC .......................................................... 292/201
See application file for complete search history.

(56) References Cited

U.S. PATENT DOCUMENTS

| | | | | |
|---|---|---|---|---|
| 10,472,869 | B2 | 11/2019 | Fannon et al. | |
| 11,643,852 | B2 | 5/2023 | Drost et al. | |
| 11,795,738 | B2 * | 10/2023 | Ney | E05B 81/14 |
| 2013/0270840 | A1 * | 10/2013 | Lujan | E05C 19/12 292/96 |
| 2014/0203573 | A1 * | 7/2014 | Lujan | E05B 81/00 292/217 |
| 2016/0312499 | A1 * | 10/2016 | Fannon | E05B 81/06 |
| 2018/0058112 | A1 * | 3/2018 | Okuma | E05B 81/06 |
| 2018/0087298 | A1 * | 3/2018 | Strole | B62D 33/037 |
| 2024/0167303 | A1 * | 5/2024 | Reusch | E05B 81/90 |

FOREIGN PATENT DOCUMENTS

| | | | | |
|---|---|---|---|---|
| DE | 102004036655 | A1 * | 2/2006 | E05B 81/22 |
| DE | 102008048773 | A1 | 3/2010 | |
| DE | 102011012650 | A1 | 8/2012 | |
| DE | 102018107210 | A1 | 10/2019 | |
| DE | 102019107845 | A1 | 11/2020 | |
| EP | 2050903 | A2 | 4/2009 | |
| KR | 200148443 | Y1 | 6/1999 | |
| WO | WO-2020211905 | A1 * | 10/2020 | B60J 5/047 |

* cited by examiner

CLOSING DEVICE FOR A MOTOR VEHICLE LOCK

This application is a national phase of International Patent Application No. PCT/DE2021/100958 filed Dec. 2, 2021, which claims priority to German Patent Application No. 10 2020 132 139.2 filed Dec. 3, 2020, each of which is hereby incorporated herein by reference in its entirety.

FIELD OF DISCLOSURE

The invention relates to a closing device for a motor vehicle lock, in particular a motor vehicle door lock closing aid, with a locking mechanism consisting substantially of a rotary latch and a pawl, further with an electric motor, and a transmission following the electric motor, wherein the transmission operating on the rotary latch at least during a closing process.

BACKGROUND OF DISCLOSURE

Closing devices for motor vehicle locks and in particular motor-vehicle door lock closing aids have been used for some time, such as, for example, by the generic prior art according to DE 198 28 040 A1. In this case, an electric motor is provided which sets a control disk into rotations via a motor shaft and a screw. In this context, the rotary latch has a stop element which interacts with the control disk during a closing process. In this case, the transmission is defined by the motor shaft, the control disk and a pin located thereon. As a result, the term “transmission” is to be interpreted broadly within the scope of the present application, namely to the effect that the transmission typically ensures a transmission of rotational movements of the motor shaft of the electric motor in the broadest sense.

This can be realized and implemented by the combined effect of the screw in conjunction with the control disk and the pin. In addition, other embodiments of the transmission are also conceivable.

Thus, the further and likewise generic prior art according to DE 10 2019 107 845 A1 works with the help of an electric drive on a traction mechanism, which applies the required closing force to the rotary latch via a closing pawl. In order to realize and implement a pinch protection at this point, voltage and/or current pulses are generated during a closing process. As a function of this, a controller can switch off the electric drive. In addition, the drive can be reversed in this case.

As a result, an effective pinch protection can be realized and implemented. However, the design is complex. However, such pinch protection is practically indispensable in such closing devices in order to avoid injuries. This is substantially explained by the fact that during the closing process at the rotary latch, a locking bolt caught by the rotary latch is also acted upon in a closing sense. Since the locking bolt is typically connected to an associated motor vehicle door, a closing movement of the motor vehicle door in question directly corresponds to this. If during this process a finger of an operator get into a gap between the motor vehicle door and a motor vehicle body, pinching can occur.

At the same time, the required effectiveness is naturally to be provided unchanged, and the closing device should in particular be able to overcome counterforces occurring when closing by the door rubbers to be compressed between the associated motor vehicle door and the motor vehicle body.

SUMMARY OF DISCLOSURE

The invention is therefore based on the technical problem of further developing such a closing device in such a manner that, with unchanged effectiveness, a structurally simple and cost-effective embodiment is provided for interrupting the closing movement.

In order to solve this technical problem, a closing device of the generic type for a motor vehicle lock is characterized in the context of the invention in that the transmission has a force flux element that can be selectively engaged and disengaged for the mechanical interruption of the closing operation.

Within the scope of the invention, for example, no complex sensory solution is provided for realizing a pinch protection, as is the subject matter of DE 10 2019 107 845 A1. Rather, the procedure is such that in the end the force flow from the electric motor via the transmission to the rotary latch is simply and quite profanely mechanically interrupted without a sensor query. For this purpose, the transmission has at least one force flux element which can be engaged and disengaged according to the invention. In the engaged state, the force flux element ensures that rotational movements of an output shaft of the electric motor are translated with the aid of the transmission and then transferred to the rotary latch which can be acted upon by the transmission during the closing operation.

In contrast to a clutch, which can be engaged and disengaged, for example, the force flux element that can be engaged and disengaged contributes in the invention to realizing the desired transmission ratio. I.e., while a clutch can also provide or ensure a separation of the force flux, for example, such a clutch is made available according to the invention by the force flux element that can be engaged and disengaged, wherein the force flux element as such being part of the transmission which contributes to the translation. For this reason, an additional clutch is expressly dispensable and not provided according to the invention.

The disengaged state of the force flow element now corresponds to the fact that the force flux from the electric motor to the rotary latch is interrupted and consequently the electric motor cannot (longer) act on the rotary latch in a pulling sense. Rather, the rotary latch is mechanically separated from the electric motor. As a result, an associated motor vehicle door can be opened directly. This is because when the force flux element is disengaged, the rotary latch is generally free (in the case of additionally lifted pawl) and can be opened directly so that the locking bolt previously caught with the aid of the rotary latch is released. The same applies to the associated motor vehicle door.

As a result, a structurally particularly simple and consequently also cost-effective pinch protection is provided overall, or a particularly simple and cost-effective interruption of the closing process is made possible. For this purpose, the force flux element of the transmission following the electric motor is specially designed, namely it can be selectively engaged and disengaged.

In order to realize and implement the engagement and disengagement of the force flux element in detail, the force flux element can typically be designed in such a manner that it can be acted upon in a linear manner. In principle, a rotational application of the force flux element for engaging and disengaging is also possible. However, since the force flux element is typically a gearwheel element, linear loading is recommended for engagement and disengagement.

This is because in this manner the force flux element designed as a gearwheel element can be directly spaced out of an engagement plane so that the force flux is interrupted. In addition, it has proven successful in this context if the force flux element is pretensioned by means of a spring in the engaged position. As a result, the force flux element can be selectively disengaged against the force of the spring and, after the end of its application into the disengaged position, returns directly to the engaged position.

For the loading of the force flux element, it has proven itself to load this with the help of a handle or a separate motorized drive. This can be done directly or indirectly. When the force flux element is applied indirectly, it is conceivable that interposed transmission means are provided. These can be rods, bowden cables, levers, etc. It is thus conceivable for a user to transfer the force flux element into the disengaged state with the aid of the handle with the interposition of the transmission element.

In these all cases, the force flux element and, if applicable, the pawl can be acted upon by the handle or the own motorized drive. As a result, not only is the force flux from the electric motor to the rotary latch interrupted. In addition, the handle or its own motorized drive ensures that the pawl that is typically already engaged in the rotary latch during the closing operation is simultaneously lifted from its engagement with the rotary latch. As a result, the rotary latch is completely free, namely both from the electric motor and the pawl and can be pivoted open immediately.

In addition, the force flux element and, if applicable, the pawl can also be transferred directly and immediately with the aid of the own motorized drive into the disengaged state. In most cases, however, a handle and a corresponding manual application are used to keep the costs low.

A force flux element that can be engaged and disengaged linearly as part of a transmission in connection with a motorized drive in a motor vehicle is generally already known from U.S. Pat. No. 10,472,869 B2. However, the known drive is an opening drive which works on the pawl. In contrast to the closing devices in question here, such opening drives are generally designed to be smaller because so high torques are not required on the output side. In addition, in such opening drives an additional lifting of the pawl by the rotary latch is not necessary due to the design, because this is the primary and only task of the opening drive. In contrast, in the present invention, the handle or its own motorized drive for loading the force flux element typically ensures that the pawl is also acted upon, namely in such a manner that it is lifted from its engagement with the rotary latch when the closing process of the rotary latch is interrupted in this manner. Accordingly, the opening drive according to U.S. Pat. No. 10,472,869 B2 is basically constructed and designed differently than the closing devices in question here.

As already explained above, the force flux element is advantageously a gearwheel element. Said gearwheel element can be mounted in an axially displaceable manner in a transmission element. Since a force flux takes place via the gearwheel element and the transmission element, which is typically accompanied by a rotational movement in this case, the gearwheel element is usually coupled in a rotationally fixed manner to the transmission element.

In order to realize and implement the rotationally fixed coupling in detail, the gearwheel element generally engages with at least one radial pin in a journal receptacle of the transmission element. In most cases, a plurality of radial pins are also provided on the gearwheel element, which engage in a rotationally fixed and at the same time axially displaceable manner in associated pin receptacles of the transmission element.

In order to implement such a shape topologically particularly easily and elegant, the gearwheel element is usually equipped with the radial pin on the base side. This is followed by a central piece. A toothing, which meshes with a further transmission element, is then provided on the head side of the gearwheel element. This further transmission element is advantageously a drive pawl on the output side of the transmission, with the aid of which the rotary latch is acted upon. For this purpose, the drive pawl can engage, for example, on a pin of the rotary latch and in this manner bring about the pivoting movement of the rotary latch in the pulling sense required for the closing process of the rotary latch.

The individual pin receptacle of the transmission element or the plurality of pin receptacles are designed to be open at least in the axial direction, so that the gearwheel element can be moved back and forth axially with respect to the transmission element with its radial pin engaging in the respective pin receptacle. Because the gearwheel element designed as a force flux element interacts with its toothing typically with the previously discussed drive pawl for driving the rotary latch, the gearwheel element in question is generally produced from metal or steel. This is usually also true for the gearwheel element that is axially displaceable in the transmission element. In principle, however, the gearwheel element and the transmission element can also be made of plastic.

In most cases, the transmission following the electric motor also has at least one further transmission element that is connected upstream of the transmission element that supports the gearwheel element. This transmission element may mesh with a screw on the output shaft of the electric motor. Both the screw and the transmission element meshing therewith are generally produced from plastic, but can also be produced in metallic form, for example from steel, aluminum, etc. In addition, it is conceivable to work at this point with an involute toothing. This applies, in an understandable manner, only by way of example.

Moreover, the individual transmission elements, like the gearwheel element, can each be equipped with a spur toothing, a helical toothing or also with an involute toothing. All alternatives are conceivable and included within the scope of the invention.

As a result, a closing device for a motor vehicle lock and, in particular, a motor vehicle door lock closing aid is provided, which enables a not only effective interruption of the closing operation, but is realized and implemented in a manner that is simple in terms of loading. For this purpose, the force flux element or gearwheel element, which can be engaged and disengaged as desired, is provided as part of the transmission. Consequently, additional devices, clutches, etc. can be expressly dispensed with. Rather, the force flux element or gearwheel element is configured as part of the transmission in such a manner that it can be engaged and disengaged in order to be able to selectively interrupt and close the force flux. Herein lie the essential advantages.

BRIEF DESCRIPTION OF DRAWINGS

The invention is explained in greater detail below with reference to drawings which show only one exemplary embodiment and in which.

DETAILED DESCRIPTION

Figure 1:
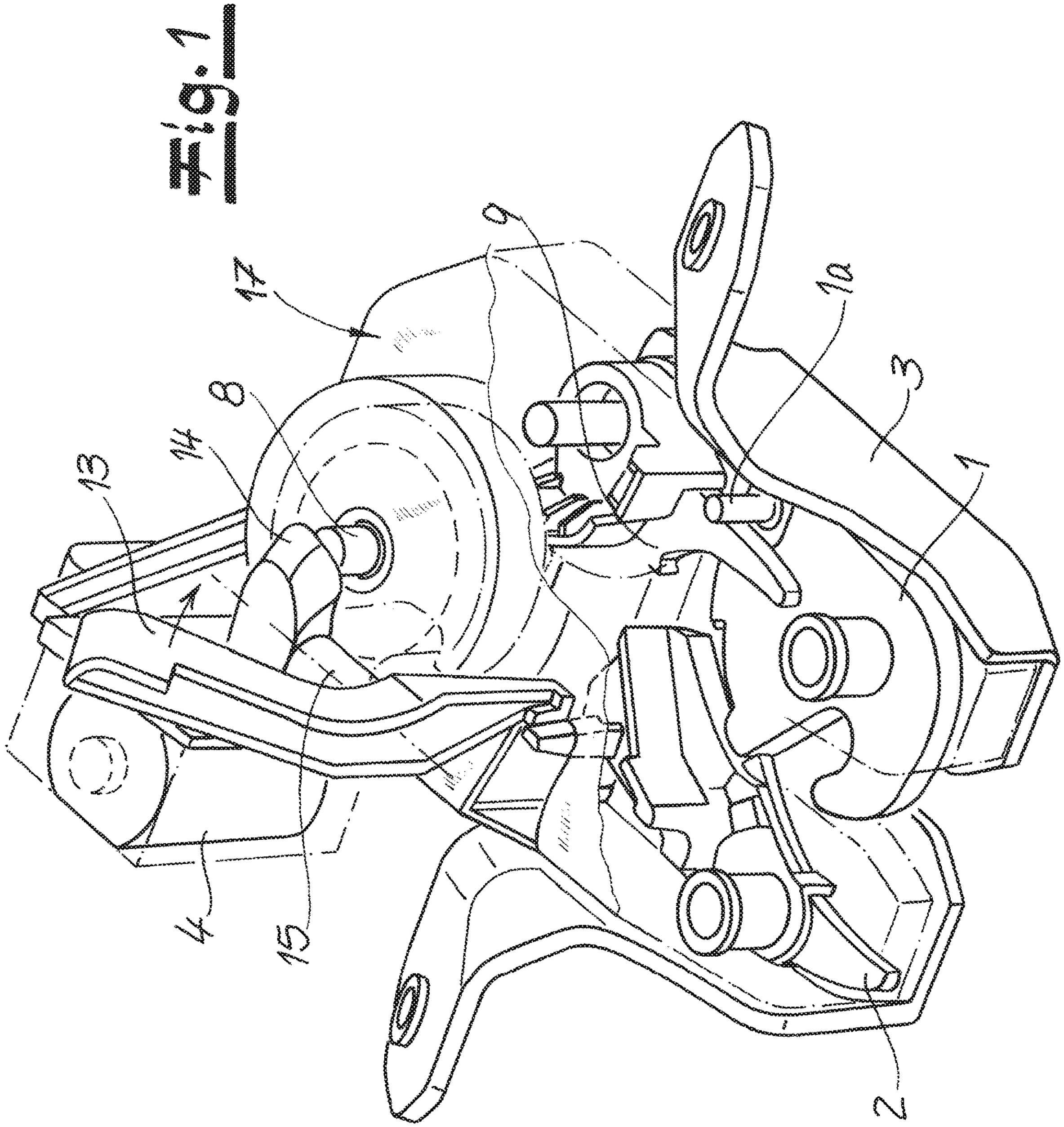
FIGS. 1 and 2 show the closing device according to the invention in a perspective view together with a handle for interrupting a closing operation.
Figure 2:
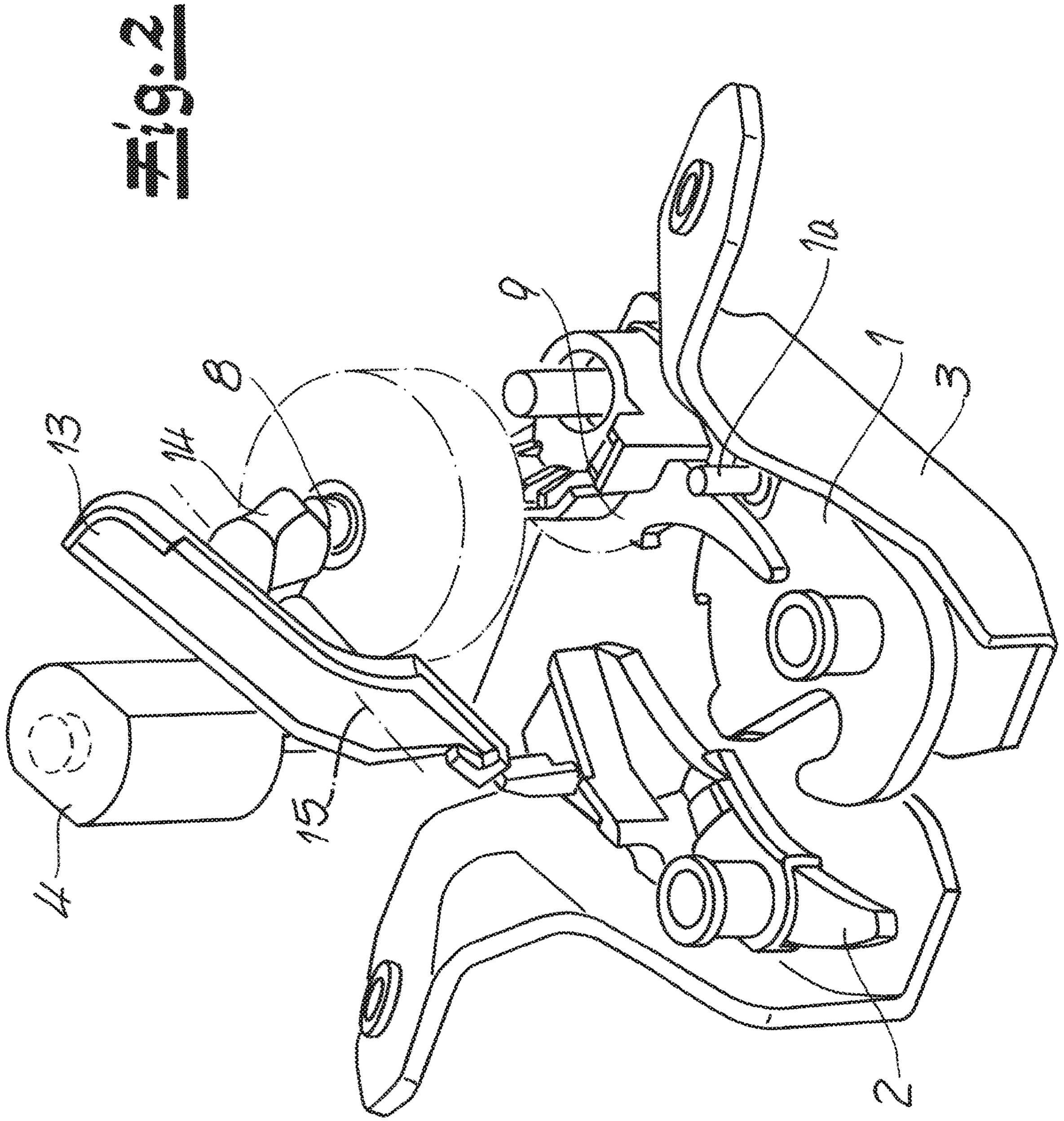

FIGS. 1 and 2 generally show a closing device for a motor vehicle lock. In the exemplary embodiment, the motor vehicle lock is a motor vehicle door lock. As a result, a motor vehicle door lock closing aid is realized as a whole. In its basic structure, it has a locking mechanism 1, 2 consisting substantially of a rotary latch 1 and a pawl 2. The locking mechanism 1, 2 is rotatably mounted in a metal lock case 3.

Furthermore, an electric motor 4 and a transmission 5, 6, 7, 8, 9 following the electric motor 4 can be seen, which is explained in more detail below.

The transmission 5, 6, 7, 8, 9 operates on the rotary latch 1 at least during a closing operation. This can be seen best and in principle with reference to FIG. 3.

In fact, the design is in detail such that the electric motor 4 has a screw on its output shaft 10. The screw 5 meshes with a transmission element 6. The first transmission element 6 in turn operates on a further second transmission element 7.

A gearwheel element 8 is mounted In the transmission element 7 In a rotationally fixed and axially displaceable manner, which is explained in more detail below as a force flux element 8 designed according to the invention and which can be selectively engaged and disengaged. The gearwheel element 8 itself drives a drive pawl 9 on the output side of the transmission 5 to 9. During a closing operation, the drive pawl 9 is pivoted about its axis in the clockwise direction, as indicated by a corresponding arrow in FIG. 3. The pivoting movement of the drive pawl 9 in the clockwise direction has the result that the drive pawl 9 moves against a pin 1 a on the rotary latch 1 and is consequently acted upon in the drawing, i.e., in the sense of a counterclockwise movement about its axis also indicated in FIG. 3.

As a result, a locking bolt 11 is increasingly drawn into an insertion slot 12 of the lock case 3. Since the locking bolt 11 is connected to a motor vehicle door, not shown, this process also corresponds to the motor vehicle door in question being moved into a closed position in comparison to the motor vehicle body that accommodates and pivots it and is also not expressly shown.

According to the invention, the design is now such that the transmission 5 to 9 in question can be mechanically interrupted during a closing operation of the rotary latch 1 and consequently of the associated motor vehicle door. Such an interruption is necessary, for example, in order to ensure a pinch protection. For this purpose, the transmission 5 to 9 for the mechanical interruption of the closing operation has the previously mentioned and explained, selectively retractable force flux element 8, in which the exemplary embodiment is a gearwheel element 8.

Figure 3:
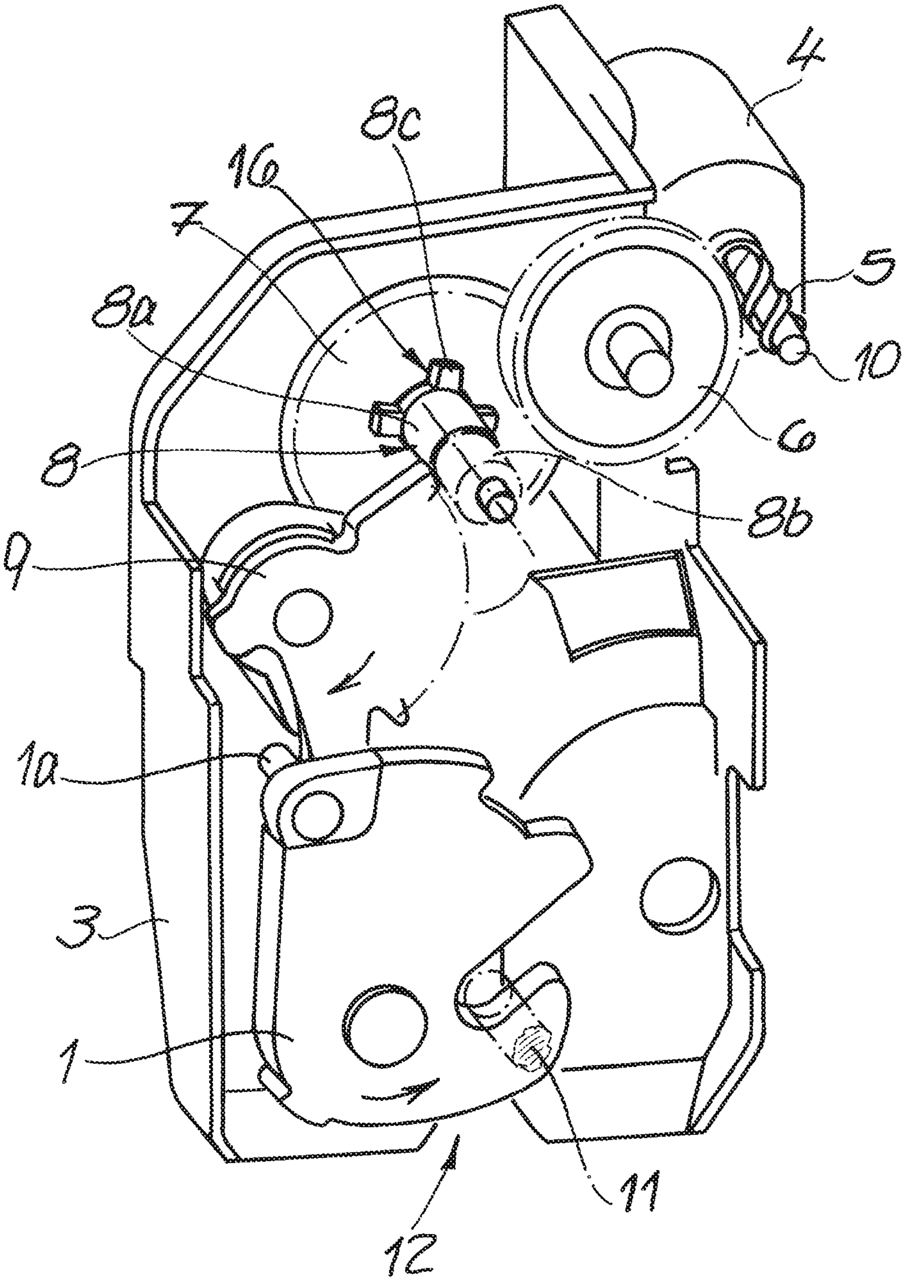
FIGS. 3 and 4 show the subject matter according to FIGS. 1 and 2 from another viewing angle with engaged force flux element (FIG. 3) and the force flux element in disengaged state (FIG. 4).
Figure 4:
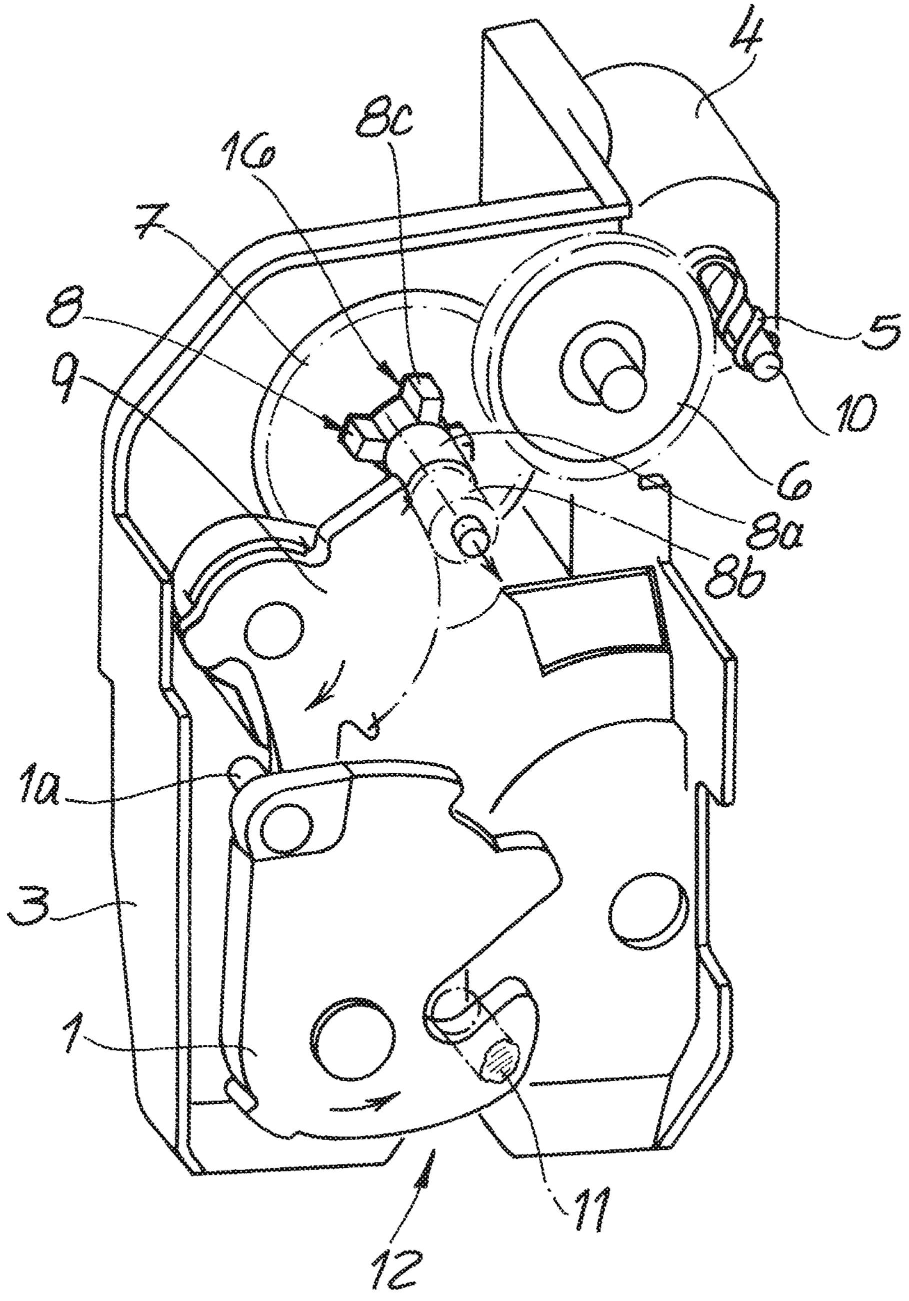

In fact, the force flux element or gearwheel element 8 can be designed to be linearly loadable, namely can be moved axially or linearly, as is apparent from an arrow in FIG. 4. In this context, an additionally provided and not expressly illustrated spring may ensure that the force flux element 8 is pretensioned in its engaged position by means of said spring. The engaged position of the force flux element or gearwheel element 8 is shown in FIG. 3. In contrast, FIG. 4 corresponds to the disengaged position of the force flux element or gearwheel element 8.

In order now to transfer the force flux element 8 from its engaged position according to the illustration in FIG. 3 into the disengaged position according to FIG. 4, a handle 13, 14 is realized according to the exemplary embodiment, which can best be understood by means of FIGS. 1 and 2. In fact, the handle 13, 14 is composed of a pivot lever 13 that can be rotated about an axis 15 on the one hand and a nose 14 that is non-rotatably coupled to the pivoting lever 13 on the other hand.

A rotational movement of the pivot lever 13 about its axis 15 in the direction of movement indicated in FIG. 1, which is shown in the sequence of FIGS. 1 and 2, results in the fact that the lug 14, which is connected to the pivot lever 13 in a rotationally fixed manner, acts as a component of the handle 13, 14 on the force flow element 8 or gearwheel element, namely pressing the force flow element "downwards" in the illustration according to FIGS. 1 and 2.

By supplying the force flux element 8 with the aid of the nose 14 as a component of the handle 13, 14, the force flux element or gearwheel element 8 changes from its engaged position in FIG. 3 (according to the illustration in FIG. 1) into the disengaged position, as shown in FIG. 4. This corresponds to the pivoted position of the handle 13, 14 according to FIG. 2. In this process, the force flux element or gearwheel element 8 is axially displaced relative to the second transmission element 7 supporting it. For this purpose, the gearwheel element 8 is rotationally coupled to said second gear element 7.

For this purpose, the gearwheel element 8 has a plurality of radial pins **8*c*, which engage in the associated pin receptacles 16 in the second transmission element 7. In fact, according to the exemplary embodiment four radial pins 8*c* originating at a regular 90° distance from a center of the predominantly cylindrical gearwheel element 8 are realized. These engage in four correspondingly arranged pin receptacles 16 in the second transmission element 7**.

It can be seen that the overall cylindrical gearwheel element or force flux element 8 is equipped on the base side with the radial pin **8*c* in question. Subsequently, a central piece 8*a* is provided, which is designed as a cylinder section in the exemplary embodiment. The central piece 8 a is adjoined by a toothing 8*b* provided on the head side of the gearwheel element or force flux element 8. With this toothing 8*b*, the force flux element or gearwheel element 8 engages in the drive pawl 9 or a toothing there and ensures during the locking process of the rotary latch 1 that the drive pawl 9 is pivoted about its axis in the clockwise direction about its axis in the illustration according to FIG. 3 and thus moves against the pin 1*a* of the rotary latch 1** in order to pull it in the counterclockwise direction.

Only a plastic housing or lock housing 17 that houses the entire motor vehicle lock is indicated. It can be seen that the handle 13, 14 is mounted on the said lock housing 17 outside of the plastic housing 17 so as to be rotatable about the axis 15. As a result, the handle 13, 14 can be acted upon directly by an operator or is accessible as required via an extension, a bowden cable, etc. As a result, the closing operation can be interrupted immediately if necessary and in this manner a particularly simple and cost-effective pinch protection is realized.

LIST OF REFERENCE SIGNS

- 1, 2 locking mechanism
- 1 rotary latch
- **1*a*** pin
- 2 pawl
- 3 lock case
- 4 electric motor
- 5, 6, 7, 8, 9 transmission
- 5 screw
- 6 first transmission element
- 7 second transmission element
- 8 gearwheel element, force flux element
- **8*a*** central piece
- **8*b*** toothing

8*c* radial pin
9 drive pawl
10 output shaft
11 locking pin
12 insertion slot
13, 14 handle
13 pivot lever
14 nose
15 axis
16 pin receptacle
17 lock housing, plastic housing

The invention claimed is:

1. A closing device for a motor vehicle lock comprising:

a locking mechanism including a rotary latch and a pawl, an electric motor, and a transmission following the electric motor, wherein the transmission operates on the rotary latch at least during a closing operation on the rotary latch, wherein the transmission has a force flux element which can be selectively moved between an engaged position and a disengaged position for mechanically interrupting the closing operation when in the disengaged position, wherein the force flux element includes a pin that engages a pin receptacle in a transmission element of the transmission to rotationally couple the force flux element and the transmission element, wherein the force flux element is axially movable relative to the transmission element while maintaining the rotational coupling between the force flux element and the transmission element, and wherein the force flux element and pawl are directly acted upon by a handle with a pivot lever such that a single rotational pivoting movement of the pivot lever about an axis moves both the force flux element to the disengaged position and the pawl from an engagement position where the pawl engages the rotary latch to a disengagement position where the pawl is spaced from the rotary latch.

2. The device according to claim 1, wherein the force flux element is configured to be acted upon linearly for movement between the engaged position and the disengaged position.

3. The device according to claim 1, wherein the force flux element is prestressed in the engaged position by a spring.

4. The device according to claim 1, wherein the force flux element is a gearwheel element.

5. The device according to claim 4, wherein the gearwheel element further is rotationally coupled to the transmission element.

6. The device according to claim 1, wherein the force flux element includes a plurality of pins including the pin that engage in an associated plurality of pin receptacles of the transmission element in a rotating manner and simultaneously in an axially displaceable manner.

7. The device according to claim 4, wherein the gearwheel element has the pin on a base side, and the gearwheel element has a central piece, and toothing on a head side that meshes with a further transmission element of the transmission.

8. The device according to claim 1, wherein in the engaged position of the force flux element the force flux element ensures that forces from the electric motor are transferred to the rotary latch, and in the disengaged position of the force flux element the rotary latch is mechanically separated from the electric motor.

9. The device according to claim 3, wherein the force flux element is selectively disengaged against a force of the spring, and after an end of disengagement the spring force returns the force flux element to the engaged position.

10. The device according to claim 1, wherein the force flux element drives a drive pawl when in the engaged position to drive the rotary latch.

11. The device according to claim 1, wherein the handle further comprises a non-rotatable nose coupled to the pivot lever, wherein upon operation of the handle the nose engages with the force flux element to move the force flux element to the disengaged position.

12. The device according to claim 11, wherein the handle directly engages the pawl to move the pawl to the disengaged position upon operation of the handle.

* * * * *